(12) United States Patent
Nourian et al.

(10) Patent No.: US 11,568,286 B2
(45) Date of Patent: Jan. 31, 2023

(54) PROVIDING INSIGHTS ABOUT A DYNAMIC MACHINE LEARNING MODEL

(71) Applicant: FAIR ISAAC CORPORATION, Roseville, MN (US)

(72) Inventors: Arash Nourian, Alamo, CA (US); Richard Spjut, San Jose, CA (US); Longfei Fan, Los Altos, CA (US); Parama Dutta, Cupertino, CA (US); Jari Koister, Menlo Park, CA (US); Andrew Flint, El Cerrito, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 785 days.

(21) Appl. No.: 16/263,734

(22) Filed: Jan. 31, 2019

(65) Prior Publication Data
US 2020/0250556 A1 Aug. 6, 2020

(51) Int. Cl.
| | |
|---|---|
| *G06N 5/04* | (2006.01) |
| *G06Q 10/06* | (2012.01) |
| *G06N 20/00* | (2019.01) |
| *G06K 9/62* | (2022.01) |
| *G06N 20/20* | (2019.01) |

(52) U.S. Cl.
CPC .......... *G06N 5/045* (2013.01); *G06K 9/6267* (2013.01); *G06N 20/00* (2019.01); *G06N 20/20* (2019.01); *G06Q 10/0635* (2013.01)

(58) Field of Classification Search
CPC ........ G06N 5/045; G06N 20/20; G06N 20/00; G06K 9/6267; G06Q 10/0635
USPC .......................................................... 706/12
See application file for complete search history.

(56) References Cited

U.S. PATENT DOCUMENTS

| | | | | |
|---|---|---|---|---|
| 10,510,022 | B1 * | 12/2019 | Tharrington, Jr. | ..... G06N 5/045 |
| 10,650,667 | B1 * | 5/2020 | Afghah | ................ A61B 5/0022 |
| 10,824,959 | B1 * | 11/2020 | Chatterjee | .............. G06N 20/20 |
| 2005/0234697 | A1 | 10/2005 | Pinto et al. | |

(Continued)

FOREIGN PATENT DOCUMENTS

JP 2019537125 A * 10/2016

OTHER PUBLICATIONS

Merrill et al., "Systems and Methods for Decomposition of Non-differentiable and Differentiable Models" Jun. 8, 2018, U.S. Appl. No. 62/682,714. (Year: 2018).*

(Continued)

*Primary Examiner* — Hal Schnee
(74) *Attorney, Agent, or Firm* — Mintz, Levin, Cohn, Ferris, Glovsky and Popeo, P.C.; F. Jason Far-hadian, Esq.

(57) ABSTRACT

Computer-implemented machines, systems and methods for providing insights about a machine learning model, the machine learning model trained, during a training phase, to learn patterns to correctly classify input data associated with risk analysis. Analyzing one or more features of the machine learning model, the one or more features being defined based on one or more constraints associated with one or more values and relationships and whether said one or more values and relationships satisfy at least one of the one or more constraints. Displaying one or more visual indicators based on an analysis of the one or more features and training data used to train the machine learning model, the one or more visual indicators providing a summary of the machine learning model's performance or efficacy.

19 Claims, 15 Drawing Sheets

(56) References Cited

U.S. PATENT DOCUMENTS

| | | |
|---|---|---|
| 2011/0173116 A1 | 7/2011 | Yan et al. |
| 2012/0158623 A1 | 6/2012 | Bilenko et al. |
| 2014/0114839 A1 | 4/2014 | Neuweg et al. |
| 2015/0286955 A1* | 10/2015 | Virkar .................... G06N 20/10 706/12 |
| 2018/0032870 A1* | 2/2018 | Liu ........................ G06Q 10/04 |
| 2018/0121817 A1* | 5/2018 | Datta ..................... G06N 5/046 |
| 2019/0043070 A1* | 2/2019 | Merrill .................... G06N 5/04 |
| 2019/0180358 A1* | 6/2019 | Nandan ................ G06K 9/6269 |
| 2019/0215551 A1 | 7/2019 | Modarresi et al. |
| 2019/0325333 A1* | 10/2019 | Chan ..................... G06N 20/00 |
| 2019/0340518 A1* | 11/2019 | Merrill ................... G06F 40/56 |
| 2019/0378210 A1* | 12/2019 | Merrill ................... G06N 3/084 |
| 2020/0089650 A1 | 3/2020 | Sharma et al. |
| 2020/0110982 A1* | 4/2020 | Gou ....................... G06F 16/904 |
| 2020/0143005 A1* | 5/2020 | Nair ..................... G06F 16/9027 |
| 2021/0049503 A1* | 2/2021 | Nourian ................. G06N 5/003 |
| 2022/0051773 A1* | 2/2022 | Appelbaum ........... G16H 20/10 |

OTHER PUBLICATIONS

Casalicchio et al., "Visualizing the Feature Importance for Black Box Models" Dec. 28, 2018, arXiv: 1804.06620v3, pp. 1-16. (Year: 2018).*

Plumb et al., "Model Agnostic Supervised Local Explanations" Jan. 5, 2019, arXiv: 1807.02910v3, pp. 1-10. (Year: 2019).*

McGrath et al., "Interpretable Credit Application Predictions with Counterfactual Explanations" Nov. 16, 2018, arXiv: 1811.05245v2 pp. 1-9. (Year: 2018).*

Lundberg et al., "Consistent Individualized Feature Attribution for Tree Ensembles" Jun. 18, 2018, arXiv: 1802.03888v2, pp. 1-9. (Year: 2018).*

Friedberg et al., "Local Linear Forests" Jul. 30, 2018, arXiv: 1807.11408v1, pp. 1-25. (Year: 2018).*

Shrikumar et al., "Learning Important Features Through Propagating Activation Differences" Apr. 10, 2017, arXiv: 1704.02685v1. (Year: 2017).*

Chen et al., "An Interpretable Model with Globally Consistent Explanations for Credit Risk" Nov. 30, 2018, arXiv: 1811.12615v1, pp. 1-10. (Year: 2018).*

Mittelstadt et al., "Explaining Explanations in AI" Jan. 29, 2019, pp. 279-288. (Year: 2019).*

Honneger, Milo, "Shedding Light on Black Box Algorithms" Aug. 15, 2018, pp. i-83. (Year: 2018).*

Tan et al., "Learning Global Additive Explanations for Neural Nets using Model Distillation" Dec. 3, 2018, arXiv: 1801.08640v2, pp. 1-13. (Year: 2018).*

Hind et al., "TED: Teaching AI to Explain its Decisions" Jan. 27, 2019, pp. 123-129. (Year: 2019).*

Yoon et al., "INVASE: Instance-wise Variable Selection Using Neural Networks" Sep. 27, 2018. (Year: 2018).*

Van der Zon et al., "ICIE 1.0: A Novel Tool for Interactive Contextual Interaction Explanations" Jan. 1, 2019. (Year: 2019).*

Zaeri-Amirani et al., "A Feature Selection Method Based on Shapley Value to False Alarm Reduction in ICUs, a Genetic Algorithm Approach" Apr. 26, 2018. (Year: 2018).*

Chen et al., "L-Shapley and C-Shapley: Efficient Model Interpretation for Structured Data" Aug. 8, 2018. (Year: 2018).*

Tharrington, Jr. et al., "Efficient and Accurate Estimation of Shapley Additive Explanation Values" Dec. 3, 2018, U.S. Appl. No. 62/774,592. (Year: 2018).*

Singh et al., "EXS: Explainable Search Using Local Model Agnostic Interpretability" Sep. 11, 2018. (Year: 2018).*

Rietschel et al., "Feature Selection for Survival Analysis with Competing Risks using Deep Learning" Jan. 16, 2019. (Year: 2019).*

Zharov et al., "YASENN: Explaining Neural Networks via Partitioning Activation Sequences" Nov. 7, 2018. (Year: 2018).*

Badr, W. (2019). "6 Different Ways to Compensate for Missing Values In a Dataset (Data Imputation with examples)." Towards Data Science. 10 pages.

Wang, S. et al. (2019). "Missing Data Imputation for Machine Learning.". In: Li, B., Yang, M., Yuan, H., Yan, Z. (eds) IoT as a Service. IoTaaS 2018. Lecture Notes of the Institute for Computer Sciences, Social Informatics and Telecommunications Engineering, vol. 271. 6 pages. Springer, Cham. https://doi.org/10.1007/978-3-030-14657-3_7.

* cited by examiner

Select Models and Datasets Folder     FINISHED

Select folder name

Iffan_test_local -- Tue Jun 26 17:31:32 2018

Took 0 sec. Last updated by anonymous at June 26 2018, 5:32:21 PM

Import model training

| ApplicantAge | ApplicantTotalIncome | AverageMInFile | BureauScore | CollateralValue | De |
|---|---|---|---|---|---|
| 47.0 | 4167.0 | 56.0 | 631.0 | 110000.0 | 38. |
| 53.0 | 5416.0 | 124.0 | 624.0 | 124000.0 | 37. |
| 54.0 | 5333.0 | 89.0 | 649.0 | 103500.0 | 45. |
| 52.0 | 7250.0 | 117.0 | 670.0 | 65000.0 | 21. |
| 48.0 | 6796.0 | 81.0 | 585.0 | 88803.0 | 17. |
| 52.0 | 11657.0 | 93.0 | 614.0 | 120247.0 | 45. |

FIG. 1D

Model Information

Target Details — FINISHED — Settings

| Name | Value |
|---|---|
| Target Column Name | Risk Performance |
| Class Names | ('Good', 'that') |
| Number of classes | 2 |

Model Source and Type — FINISHED — Settings

| Name | Value |
|---|---|
| Model Type | Cardart Brocaded Trees |
| Class Name |  |
| Package Name | neighborhood |
| Package Version | 0.72 |

Model Structure — FINISHED — Settings

| Name | Value |
|---|---|
| Number of Trees | 100 |
| Min. Leaf Depth | 7 |
| Min. Leaf Count | 110 |
| Max. Leaf Count | 16 |

Featured Details — FINISHED — Settings

| Name | Value |
|---|---|
| Name targeted | im64 |
| Name Gateway | im64 |
| Number of classes | im64 |
| Number Targeted | im64 |
| Number Days | im64 |
| Number Trades | im64 |
| Number of Orders | im64 |
| Miscellaneous | im64 |

Hyperparameter — FINISHED — Settings

| Name | Value |
|---|---|
| Objective | binary |
| Source | 10 |
| era | 0.1 |
| Mass_depth | 7 |
| Silent | 1 |

Target Details — FINISHED — Settings

| Name | Value |
|---|---|
| Service Weight Column Name | Name |
| Class Names | FR,17 AUG 2018 TO 53 10 - 0000 |
| Expected Potential Frame |  |
| Model Author | 534339 |
| Training Data Size | FiCO finance issue |
| Dataset Source | FICO Service issue |
| Name | Data dictionary available by dataset |

FIG. 2B

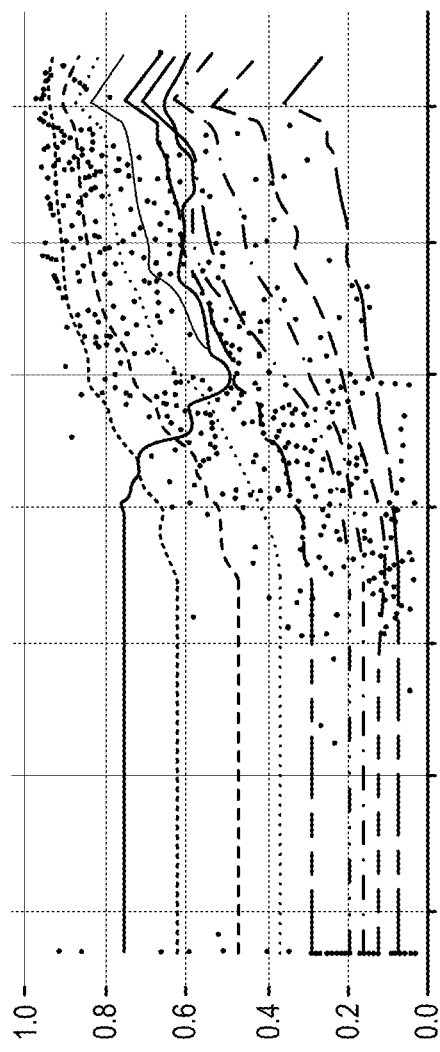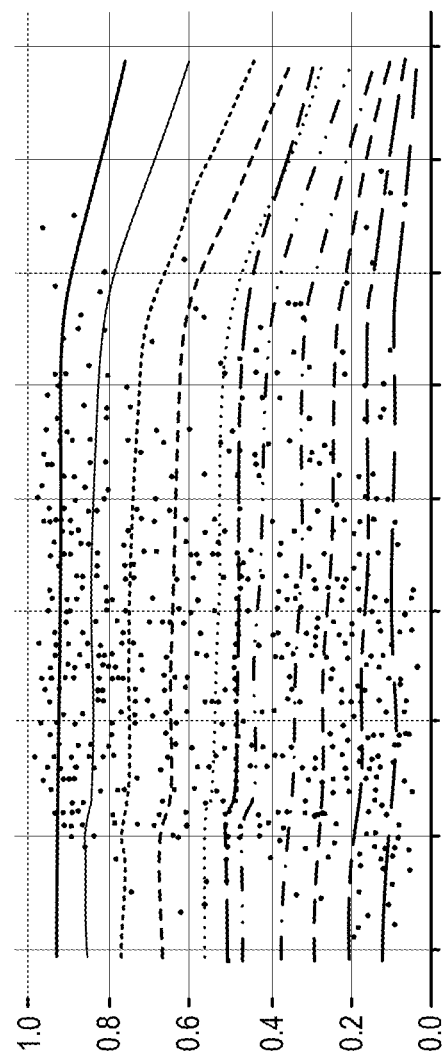
FIG. 2E

[BEGIN]

IF
ExternalRiskEstimate: 35.0_to_62.5 AND
MSinceMostRecentInqexcl7days: -7.5_to_0.5 THEN
probability of Good: 13.5% (11.3%-15.9%) ELSE IF
NetFractionRevolvingBurden: 62.5_to_inf AND
NumTradesOpeninLast12M: 1.5_to_inf THEN
probability of Good: 22.4% (18.3%-26.8%) ELSE IF
PercentTradesNeverDelq: -4.5_to_86.5 AND
MSinceMostRecentInqexcl7days: -7.5_to_0.5 THEN
probability of Good: 27.2% (23.0%-31.7%) ELSE IF
AverageMInFile: 74.5_to_97.5 AND
ExternalRiskEstimate: 74.5_to_83.5 THEN
probability of Good: 74.2% (70.1%-78.1%) ELSE IF
ExternalRiskEstimate: 83.5_to_inf AND
PercentTradesNeverDelq: 95.5_to_inf THEN
probability of Good: 85.1% (82.6%-87.4%) ELSE IF
AverageMInFile: 97.5_to_inf AND
NumBank2NatlTradesWHighUtilization: -4.0_to_0.5 THEN
probability of Good: 74.4% (69.2%-79.3%) ELSE IF
ExternalRiskEstimate: 62.5_to_67.5 AND
MSinceMostRecentInqexcl7days: -7.5_to_0.5 THEN
probability of Good: 25.1% (20.9%-29.6%) ELSE IF
ExternalRiskEstimate: 35.0_to_62.5 THEN
probability of Good: 23.8% (17.9%-30.2%) ELSE IF
PercentInstallTrades: 46.5_to_inf AND
MSinceMostRecentInqexcl7days: -7.5_to_0.5 THEN
probability of Good: 27.9% (22.7%-33.5%) ELSE IF
AverageMInFile: 7.5_to_54.5 AND
MaxDelqEver: -inf_to_6.5 THEN
probability of Good: 32.2% (25.0%-39.9%) ELSE IF
ExternalRiskEstimate: 62.5_to_67.5 AND
NumTotalTrades: 13.5_to_inf THEN
probability of Good: 51.6% (43.8%-59.4%) ELSE IF
MSinceMostRecentInqexcl7days: 1.5_to_inf AND
NumTotalTrades: 13.5_to_inf THEN
probability of Good: 73.0% (68.5%-77.3%) ELSE IF
MSinceOldestTradeOpen: 10.5_to_87.5 THEN
probability of Good: 33.6% (25.3%-42.4%) ELSE IF
ExternalRiskEstimate: 74.5_to_83.5 THEN
probability of Good: 64.0% (59.5%-68.4%) ELSE
probability of Good: 45.5% (42.4%-48.6%)

[END]

*FIG. 4*

PROVIDING INSIGHTS ABOUT A DYNAMIC MACHINE LEARNING MODEL

COPYRIGHT & TRADEMARK NOTICES

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter generally relates to artificial intelligence technology and, more particularly, to technological improvements that provide insights about the efficacy and understandability of a dynamic machine learning model.

BACKGROUND

Artificial intelligence (AI) refers to introducing human-like logic or intuition in a computing system. AI is commonly used to perform tasks that require intelligence or domain expertise which help solve problems that cannot be defined by a predetermined set of rules or fixed logic. AI systems are thus typically deployed to analyze and classify data and make predictions relying on data and dynamic calculations that are far too voluminous and complex for a human to possibly digest and perform, either mentally or by way of pen and paper.

Machine learning (ML) is a subset of AI that utilizes self-learning algorithms to implement intelligent behavior into AI systems and generally refers to the practice of teaching a computing system to learn, including the ability to dynamically adapt and analyze vast volumes of data to identify patterns, without requiring explicit programming. Unconventionally, ML models can provide predictive advantages to enhance the functionality of a system or a computing model when complex relationships or constraints are at play.

Disadvantageously, without a good understanding of the influencers, relationships or constraints that define a ML model, the model's non-routine functionality and behavior may be prone to errors or undesirable results that may not meet legal or other standards. For example, a lack of complete understanding of a model's behavior may lead to scenarios involving the encoding of unintentional or unwanted features that introduce unexpected biases into the model, where such biases undesirably violate certain principles or requirements.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, computer-implemented machines, systems and methods are disclosed for providing insights about a machine learning model, the machine learning model trained, during a training phase, to learn patterns to correctly classify input data associated with risk analysis. One or more features of the machine learning model may be analyzed, the one or more features being defined based on one or more constraints associated with one or more values and relationships and whether said one or more values and relationships satisfy at least one of the one or more constraints. One or more visual indicators may be displayed based on an analysis of the one or more features and training data used to train the machine learning model, the one or more visual indicators providing a summary of the machine learning model's performance or efficacy. In response to further analyzing the one or more features and the training data, at least one or more of a global explanation about the machine learning model or a local explanation about the machine learning model may be provided.

The global explanation may provide general information about one or more functionalities of the machine learning model and at least one of a visualization that summarizes the machine learning model's global behavior with respect to the one or more features, or an identification of a first set of features that are influential in generating one or more identifiable outcomes. The further analyzing may be performed based on at least one of a model-dependent approach or a model-independent approach, wherein the model-dependent approach takes into consideration unique properties of the machine learning model, such as the model's structure in calculating a feature's importance to the machine learning's operation for correctly classifying the input data.

The local explanation may provide information with one or more visualizations on predictions performed by the machine learning model in one or more instances. A first instance from the one or more instances may comprise one or more execution slices in which at least one or more of the machine learning model's features, constraints, values or variable correlations are identified and tracked for the purpose of understanding how the machine learning model derives a prediction in the first instance. The local explanation may provide an understanding of how possible changes to an instance's feature values adjust or shift an expected result or projected outcome.

In at least one implementation, a first threshold may be determined and the local explanation provides an understanding of how possible changes to the instance's feature values adjust or shift an expected result or projected outcome beyond the first threshold. In response to understanding how the machine learning model behaves in the first instance, the machine learning model may be tuned to select outcomes that best suit an expected result in a first set of instances. For example, the machine learning model may be tuned to minimally change one or more of the machine learning model's features in a first set of features having a first characteristic. The machine learning model may be tuned by adjusting instances that demand changes to the fewest number of features or instances with a least amount of change to the most important features of the machine learning model.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIGS. 1D through 6 are illustrative examples of visual information that may be provided for a better understanding of a model's efficacy, understandability and operational integrity, in accordance with one or more embodiments.

Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1A:
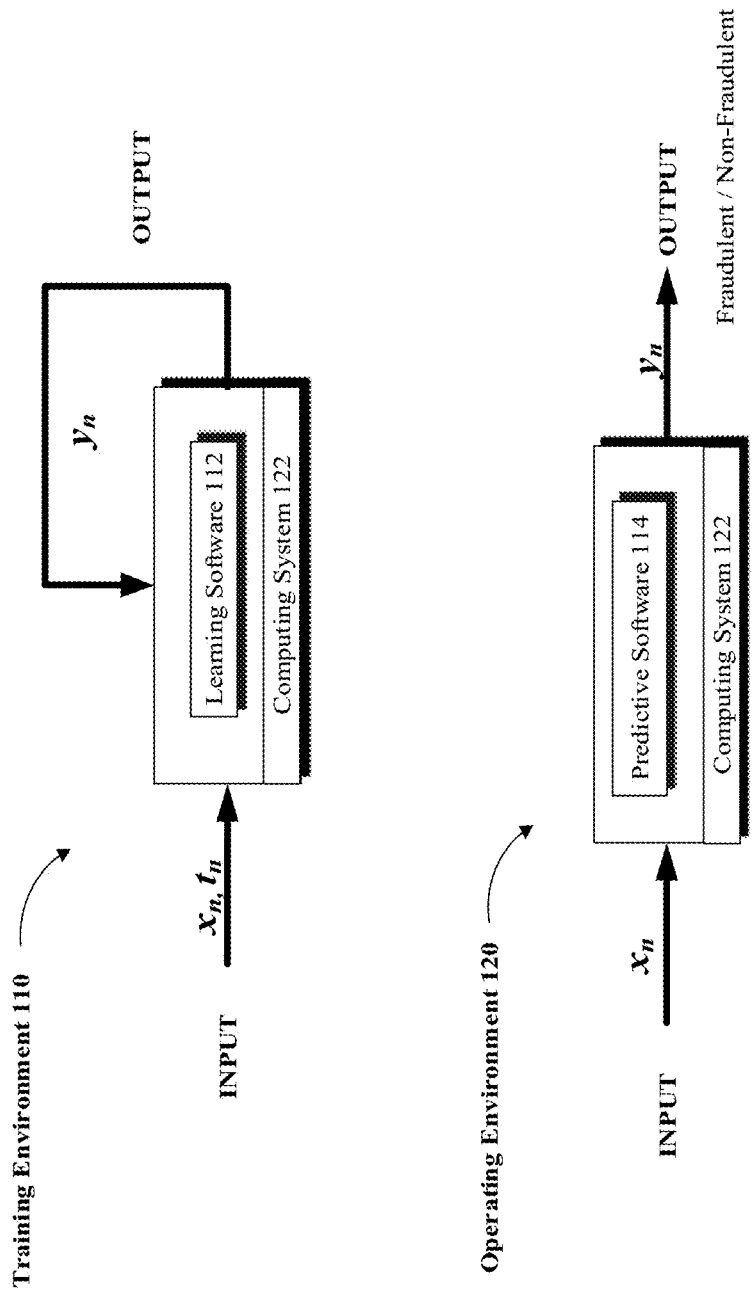
FIG. 1A illustrates example training and operating environments for a ML model, in accordance with one or more embodiments.
Figure 1B:
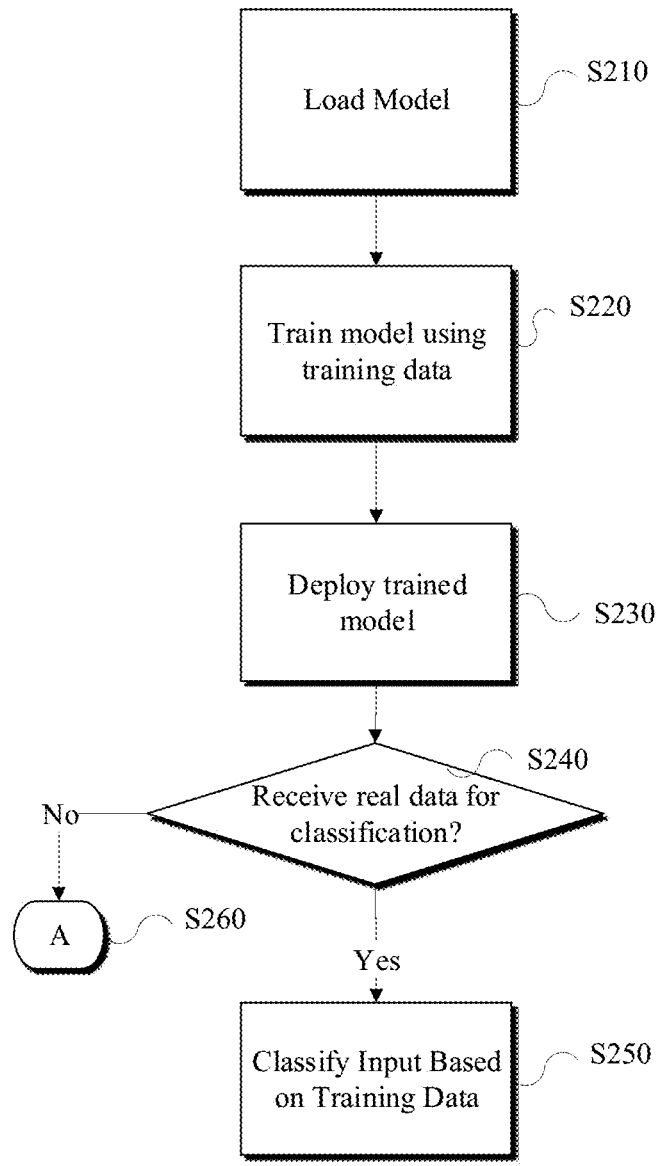
FIG. 1B is an example flow diagram of a method of training and deploying a ML model, in accordance with one or more embodiments.

Referring to FIGS. 1A and 1B, example training environment 110 and operating environment 120 for a ML model are illustrated. As shown, a computing system 122 and training data may be used to load a ML model and train the model using training data (S210, S220). Computing system 122 may be a general purpose computer, for example, or any other suitable computing or processing platform. In the training phase, learning software 112 may be a machine learning or self-learning software that receives input training data x labeled with a tag t, where the training data is already known as belonging to a certain category.

In accordance with one or more embodiments, learning software 112 may process the training data x associated with certain features without taking the labels t into consideration (i.e., blindly) and may categorize the training data according to an initial set of weights (w) and biases (b). The generated output y may indicate that training data x is classified as belonging to a certain class by learning software 112. In one aspect, the result y may be checked against the associated label (i.e., tag t) to determine how accurately learning software 112 is classifying the training data.

In the initial stages of the learning phase, the categorization may be based on randomly assigned weights and biases, and therefore highly inaccurate. However, learning software 112 may be trained based on certain incentives or disincentives (e.g., a calculated loss function) to adjust the manner in which the provided input is classified. The adjustment may be implemented by way of updating weights and biases over and over again. Through multiple iterations and adjustments, the internal state of learning software 112 may be continually updated to a point where a satisfactory predictive state is reached (i.e., until learning software 112 starts to more accurately classify the training data).

Once the initial training phase is completed, predictive software 114 may be deployed to process real data for classification in operating environment 120, where input data category is unknown (S230, S240). According to past training, software 114 may generate an output y that classifies the input data x as belonging to one or more categories (S250) or otherwise generate a notification or take other appropriate action (S260). In accordance with example embodiments, predictive software 114 may be a trained version of learning software 112 and may be executed over computing system 122 or another suitable computing system or computing infrastructure.

In example embodiments, the model may be deployed to analyze data or features associated with an applicant's profile, where the applicant is attempting to apply for obtaining credit or a loan. Based on the analysis of such features, an applicant may be approved or denied credit or may be assigned a certain risk score. It is noteworthy that example implementations and scenarios provided here with reference to financial transactions are for the purpose of illustration and providing an enabling disclosure. These examples should not be construed as limiting the scope of this disclosure to particular scenarios or implementations.

Figure 1C:
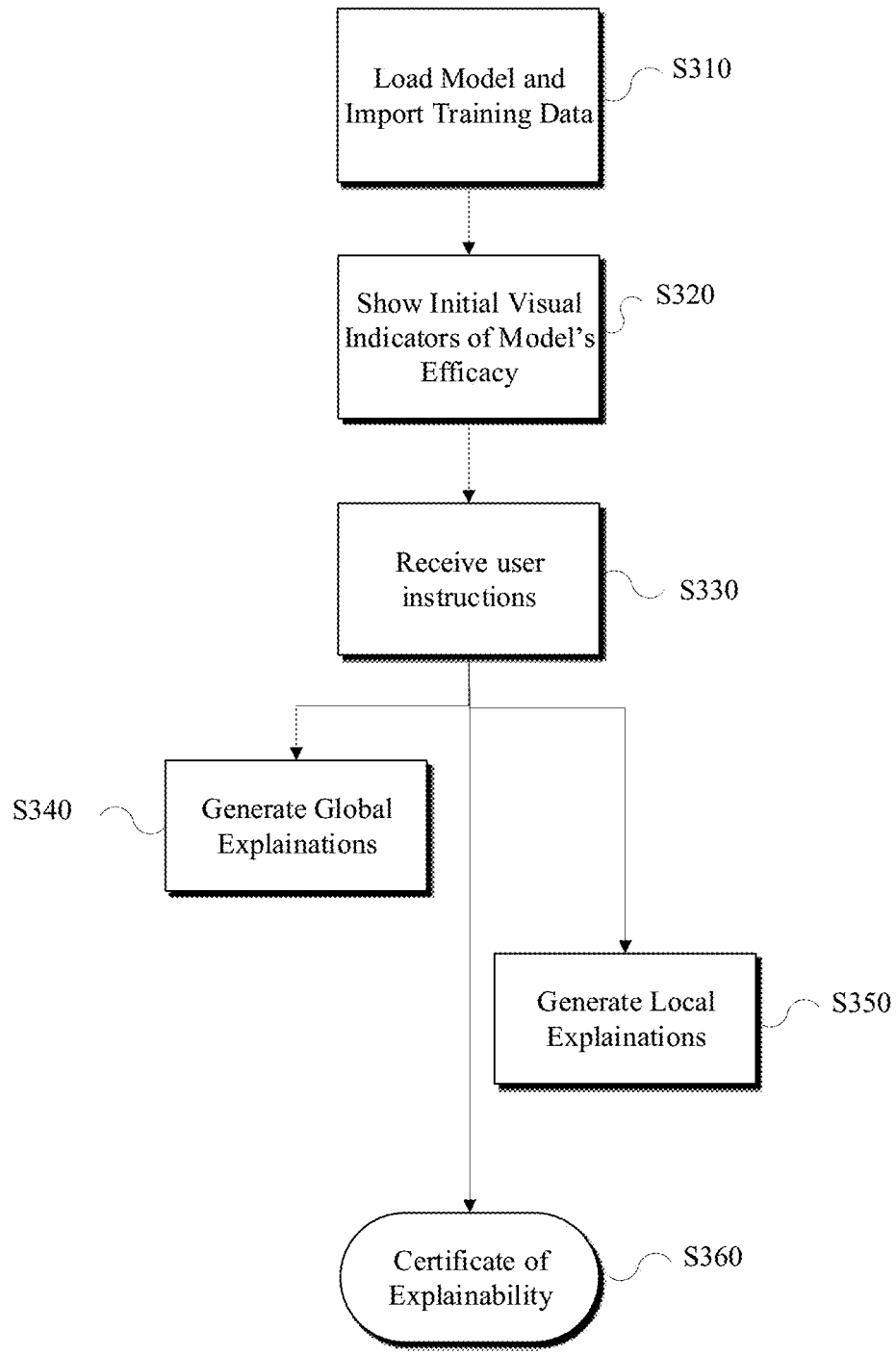
FIG. 1C is an example flow diagram of a method of providing information about the efficacy of a ML model, in accordance with one or more implementations.

Referring to FIG. 1C, in accordance with one or more implementations, a ML model may be loaded into a computing environment and training data for the model may be imported (S310). In one aspect, relationships between the model's features and one or more constraints and values used to define the model may be analyzed. As shown in FIGS. 1D through 6, for example, depending on user instructions received (S330), analysis results may be used to provide an explanation of the model's behavior and functionality globally (S340) or desirably across selected local features or instances, or both (S350). The explanations may be generated during the training of the model as well as when the model is deployed. In some implementations, a certificate of explainability may be also generated (S360), as provided in further detail herein.

Referring to FIGS. 1D through 6, depending on implementation, provided explanations may be generated in the form of visually displayable indicators such as diagrams, charts, textual definitions or code to allow for a better understanding of the components of a target model. Moreover, the manner certain components correspond to each other or how certain components are associated with the results generated by the model may be also analyzed and disclosed. For example, features that are most important to the model's functionality, factors that most contribute to certain interesting outcomes generated by the model, or possible correlations and interactions may be discovered and disclosed at different levels of granularity, depending on implementation or user instructions, to tell a story about the model's general and specific behavior during different instances.

The term "story" in the context of this disclosure may refer to results that explain a model's behavior (e.g., why certain results are generated, the reason for unexpected anomalies in the results, correlation or interaction among certain values and constraints used to define the model, etc.). Telling the story of a model with respect to interesting outcomes or features may help a user gain trust and provide a higher level of insight into a model's behavior. Further, providing explanations for the interesting outcomes or features may ultimately allow for a better understanding of how to modify or configure a model to achieve better or more optimal results or help design models that satisfy certain legal or other standards, or practical requirements and policies.

To configure or reconfigure a subject model based on the provided explanations, a user may take into account model features and characteristics that may be more important or influential in achieving certain desirable outcomes or goals (e.g., satisfying certain regulations, business policies, practical expectations, or desired performance). In example embodiments, telling the story of the model may be based on access to the model and the training data used to build the model. An example implementation for systems and methods that may achieve the above objectives may embody one or more actions or steps, for example.

Referring to FIG. 1D, in accordance with one or more aspects, a user may select a target model from a directory of defined models and may also identify training and validation data for the selected model to be imported. FIG. 1D illustrates an example interactive computing interface for selecting a model and importing the relevant data. In this example, consumer risk analysis data utilized for the purpose of training the model is imported. Using such information, a performance summary may be generated and relevant metadata about the target model may be displayed. This summery report may help provide a user with an overview of the model's performance and general features.

Figure 2A:
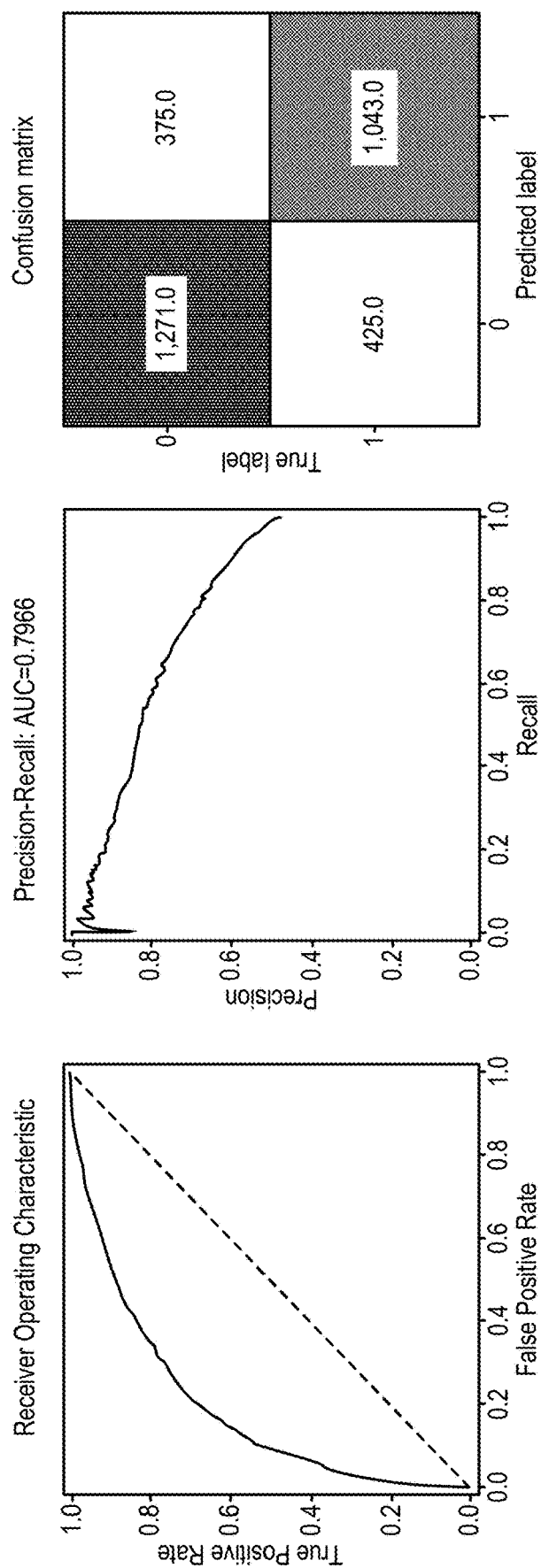

FIG. 2A illustrates example visual charts that may be generated to help a user better understand a model's behavior. The chart on the left illustrates a receiver operating characteristic (ROC) curve, the chart in the middle illustrates an area under the curve (AUC), and the chart on the right illustrates a confusion matrix. By way of example, these illustrative examples are applicable to a model for credit risk analysis, which may be used to help a lender successfully select a low-risk borrower. The ROC, AUC, confusion matrix, and other performance indicators may be utilized to provide an understanding of the performance of the model in a visual manner.

In certain implementations, the ROC may be used to represent the probability of a true positive rate and the AUC may be used to represent the degree or measure of separability (i.e., how accurately the model is capable of correctly classifying or predicting an outcome). A high AUC (e.g., AUC=0.98) would thus indicate that the model is highly accurate in classifying a data input in the correct category or class. In contrast, a low AUC would indicate a poor prediction performance. For example, an AUC=0.5 would indicate that the performance of the model in classifying an input is 50-50 at best.

The ROC curve may be created by plotting the true positive rate (TPR) against the false positive rate (FPR) at various threshold settings. The true-positive rate may represent the sensitivity, recall or probability of a correct prediction or classification by the model. The false-positive rate may provide an indication of the probability of error or false alarm (i.e., the probability of an incorrect prediction or classification).

The confusion matrix may be implemented as a data structure that may be, for example, visualized as a table or matrix that indicates the performance of a model, such that a row in the table or the matrix represents the instances in a predicted class, while a column represents the instances in an actual class. Such visualization provides an easy to understand indication of whether the model tends to erroneously classify an input, for example.

As shown in FIG. 2A, the confusion matrix may be implemented two dimensionally ("true" vs. "predicted"), where the number of correct and incorrect predictions are summarized with count values and broken down by each class to provide an insight not only into the errors being made by the model but also the types of errors that are being made. For example, the confusion matrix in FIG. 2A indicates that out of a total of over 3,000 inputs (1,271+1,043+425+375=3,114) to the model, the majority (1,271+1,043=2,314) of the inputs have been correctly classified, and a little over a quarter (425+375=800) of the inputs have been classified incorrectly.

The confusion matrix of FIG. 2A, also shows that more inputs labeled as "1" have been classified incorrectly than those labeled as "0" and more inputs labeled as "0" have been classified correctly than those labeled as "1". As such, in instances where training data is imbalanced, a viewer of the confusion matrix may determine the accuracy of the model across the training data, as opposed to simply understanding the overall accuracy of the model.

FIG. 2B illustrates additional information about a model (e.g., metadata or data that defines the values and constraints for a model's operation). For example, information presented on the top left corner of FIG. 2B indicates that the example model may generate a result column that includes risk performance values for a selected sample of borrowers (e.g., "Good" or "Bad" risk).

In one or more embodiments, the visual illustrations generated for a model provide an understanding or a verification of the model's monotonicity with respect to certain features. Monotonicity refers to a property or characteristic or value that either increases or decreases in a certain direction (i.e., always positive or always negative) or at least is constant (i.e., not increasing or decreasing in a selected interval). For example, in a credit reporting system, a model may be determined as being monotonic with respect to a certain feature.

Figure 2C:
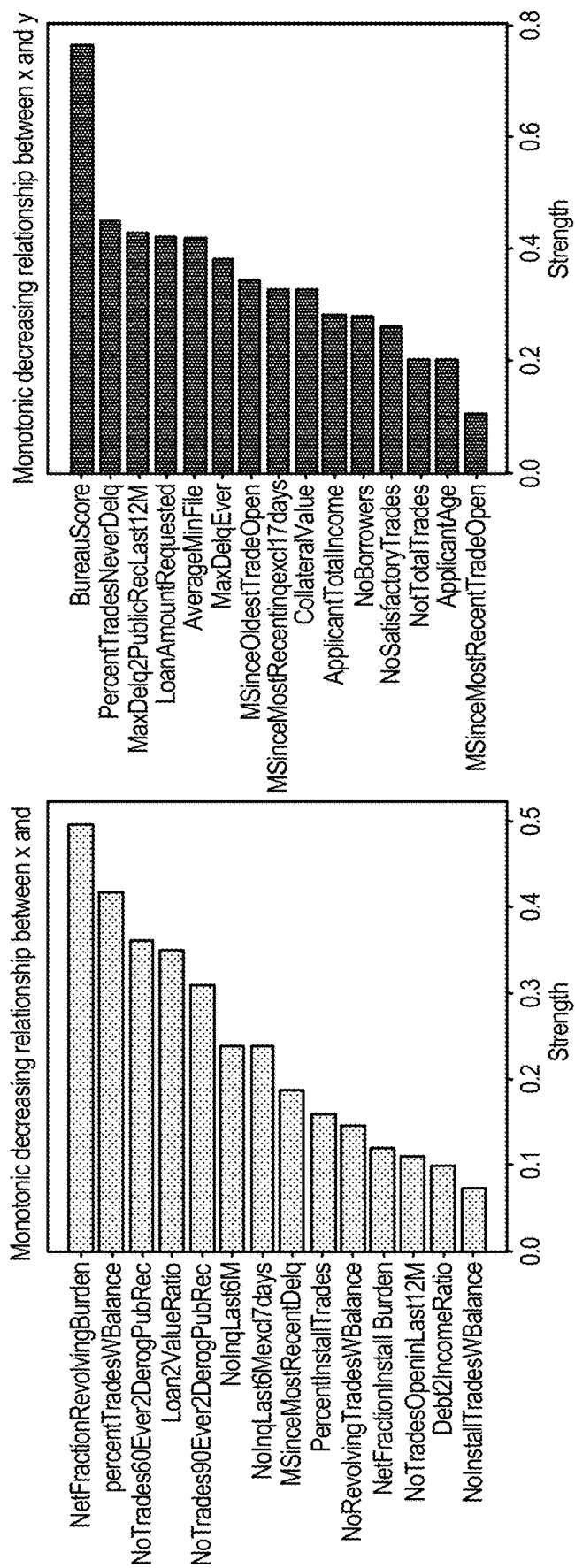
Figure 2D:
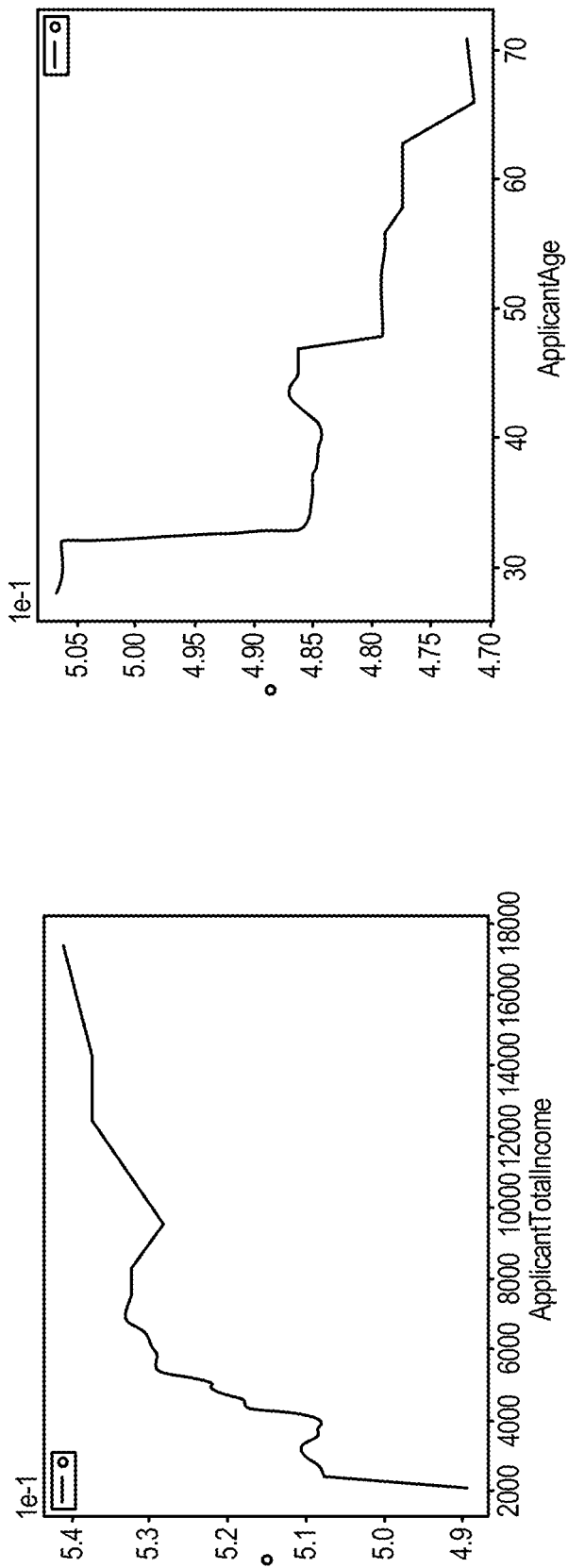

FIGS. 2C through 2E provide examples of additional visual charts or graphical user interfaces that may be provided to a user, in accordance with certain aspects, where feature monotonicity is disclosed based on an analysis of a credit risk model. Referring to FIG. 2C, an automatic monotonicity analysis example is provided that shows the features that are monodically increasing or decreasing with respect to a target variable. As part of monotonicity analysis, selected features that are deemed important may be analyzed in more detail. FIG. 2D shows the interface where the monotonicity analysis is performed on selected features (e.g., bureau score, applicant's total income, etc.) from among a plurality of features available for analysis in the target model.

Referring to FIG. 2E, during monotonicity analysis, certain features may be monotonic on average but not all the times. In at least one implementation, features that match a certain monotonic profile may be selected and a graphical analysis may be provided with ability to focus or zoom in further into the details for a better understanding or insights about where and when within the selected features the monotonicity is not in agreement with average monotonicity. As shown in FIG. 2E, a feature may be monotonically increasing on average (e.g., as indicated by the darker black line in the upper chart) but there may be instances that monotonicity is actually decreasing (while the average monotonicity is increasing (e.g., as indicated by the darker dashed line in the upper chart). The understanding of such discrepancies in the model helps determine how to develop correction techniques to be applied to the model, as desired.

In example embodiments, if the illustrations show that a feature A1, in comparison to a feature A2, is always considered to be more influential in the outcome generated by the model, then a user viewing the illustration may conclude that the risk associated with relying on feature A1 may be higher than that associated with A2, for example. Automatic detection and presentation of monotonic features in a model may thus provide important or interesting clues to investigate why or how certain results or outcomes are generated and also help a user or computing entity determine model features, values or constraints that may be reconfigured or corrected or optionally maintained to achieve better or more desirable results. Accordingly, in at least one example embodiment, a report or visual indicator or presentation may be implemented to provide information about monotonic features or results generated by a model.

In one variation, a user may be interested in type of feedback that would help a user understand a target model in a general context. Thus, certain embodiments may be implemented to provide a general summary of the model or global-level explanations, for example. In the global mode, a summary or general information may be provided about what the model does or how the model operates. For example, referring to FIGS. 3A and 3B, a visualization may be provided that summarizes a model's global behavior with respect to features and identifying which of the features is more influential in generating a certain outcome.

Figure 3A:
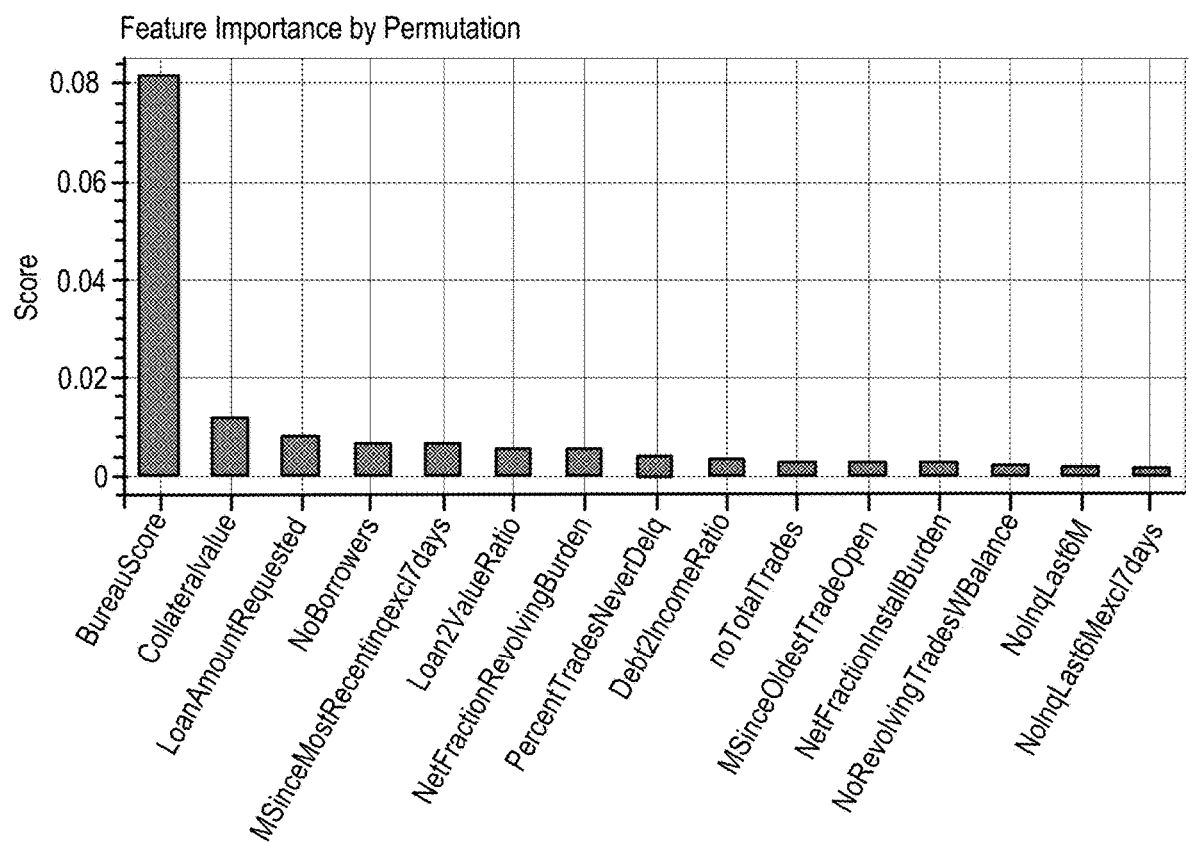

FIG. 3A illustrates, for example, a consumer risk analysis model in which the bureau score (e.g., consumer credit score) ranks highest among the features used by the model to determine risk. In other words, the generated diagram in FIG. 3A provides an easy to comprehend and interactive visual tool in form of a bar chart, for example, that would aid a user understand that, in the target model, one of the more important features in determining eligibility or risk is the credit score generated by a credit reporting bureau. As shown in the example of FIG. 3A, other more important risk determination factors may include the collateral value and the loan amount requested. Depending on implementation, more important or more contributing features, values or constraints utilized by the model may be listed in the order of importance, interest or some other logical order.

It is noteworthy that in certain embodiments the explanation of the model may list more important or interesting values, constraints or features regardless of the model type used to analyze the related or target data or taking into account the specific type of the model and its architecture when listing important features (i.e. model agnostic). For example, in the example shown in FIG. 3A, feature importance is listed by permutation, which does not take into account a particular model or algorithm type when calculating the feature importance. In the example illustrated in FIG. 3B, however, feature importance is listed by gain, which takes into account specific structure of the analyzed model (e.g., a decision tree) and how much information was lost or gained when following a certain path. Such a tool may be equipped with both model agnostic and model specific techniques to provide a comprehensive view of a feature's importance.

Figure 3B:
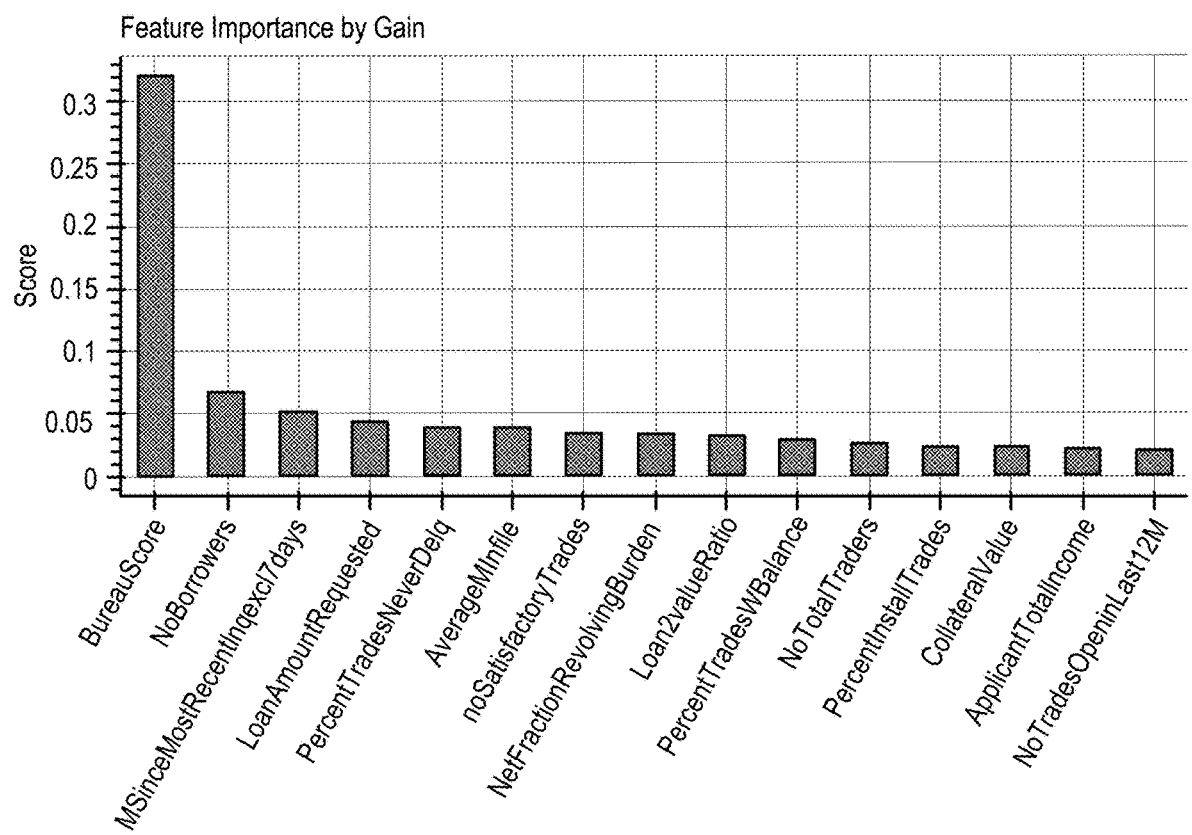

Accordingly, in the example shown in FIG. 3B, while bureau score remains listed as the top (e.g., most interesting, most influential, most important, etc.) factor or feature in the model, the order in which other interesting, influential or important features are listed is different than that shown in FIG. 3A. For example, the collateral value feature which was listed as the second most important out of 15 features in FIG. 3A is listed as the $13^{th}$ most important feature in FIG. 3B. As such, based on a review and comparison of the two example charts in FIGS. 3A and 3B, a user may be provided with additional insights as to the behavior of a model in relation with the types of analysis methodologies utilized.

Referring to FIG. 4, in some embodiments, a summary of the model may be provided by way of generating readable code that identifies different states or actions taken by the model depending on the occurrence of certain events or satisfaction of certain constraints. FIG. 4 illustrates an example code generated in the form of IF-THEN statements, for example. These statements provide an understanding of the general behavior of the model and the internal functionality built into the model.

For example, a user reading the logic code in FIG. 4 would be able to better understand the driving factors, and the respective order of influence and how satisfaction of certain constraints may result in a certain outcome. In some scenarios, if the model constraints define the value of a certain variable as equal or between certain values (e.g., belonging to a defined range), then a borrower associated with those variable values may be identified as being in a good risk category. Otherwise, the borrower may be identified as belonging to a bad risk category, for example.

As such, in a global explanation mode, visual or textual results may be generated to provide an understanding of how the model behaves with respect to the predicted outcomes of interest and the degree by which certain features may influence such outcomes. Additionally, the level of importance or contribution to the outcome or the level of interaction or association of features in a model may be also provided, where applicable. Association, as used here, may refer to a correlation between two features such that a change in the first feature value is associated with a change in a second feature value. Interaction between two feature values may refer to the possible influence a change in the first or the second feature value may have on a target value.

In contrast to the global explanation mode, in a local explanation mode, explanations may be provided for one or more predictions performed by the model in a detailed or instance context. In other words, in addition or instead of providing a general summary of the model behavior, one or more explanations may be provided that explain a predicted instance. Instance level explanations may involve analyzing and disclosing the behavior of a target model at identified execution slices in which particular model features, constraints, values or variable correlations are identified and tracked for the purpose of understanding how a value, a feature change, or a defined constraint derives the prediction.

For example, it may be interesting to know or determine how possible changes to an instance's feature values may adjust or shift the expected results or projected outcome (e.g., the calculated risk score for a borrower) beyond acceptable or unacceptable thresholds or ranges (i.e. possible correctional behavior). Thus, by having an understanding of how certain instances in a model behave, it may be possible to select or tune the model to select outcomes that best suit an expected result by, for example, choosing minimal means (e.g., instances that demand changes to the fewest number of features or instances that require least amount of change to the most important features, etc.).

Figure 5:
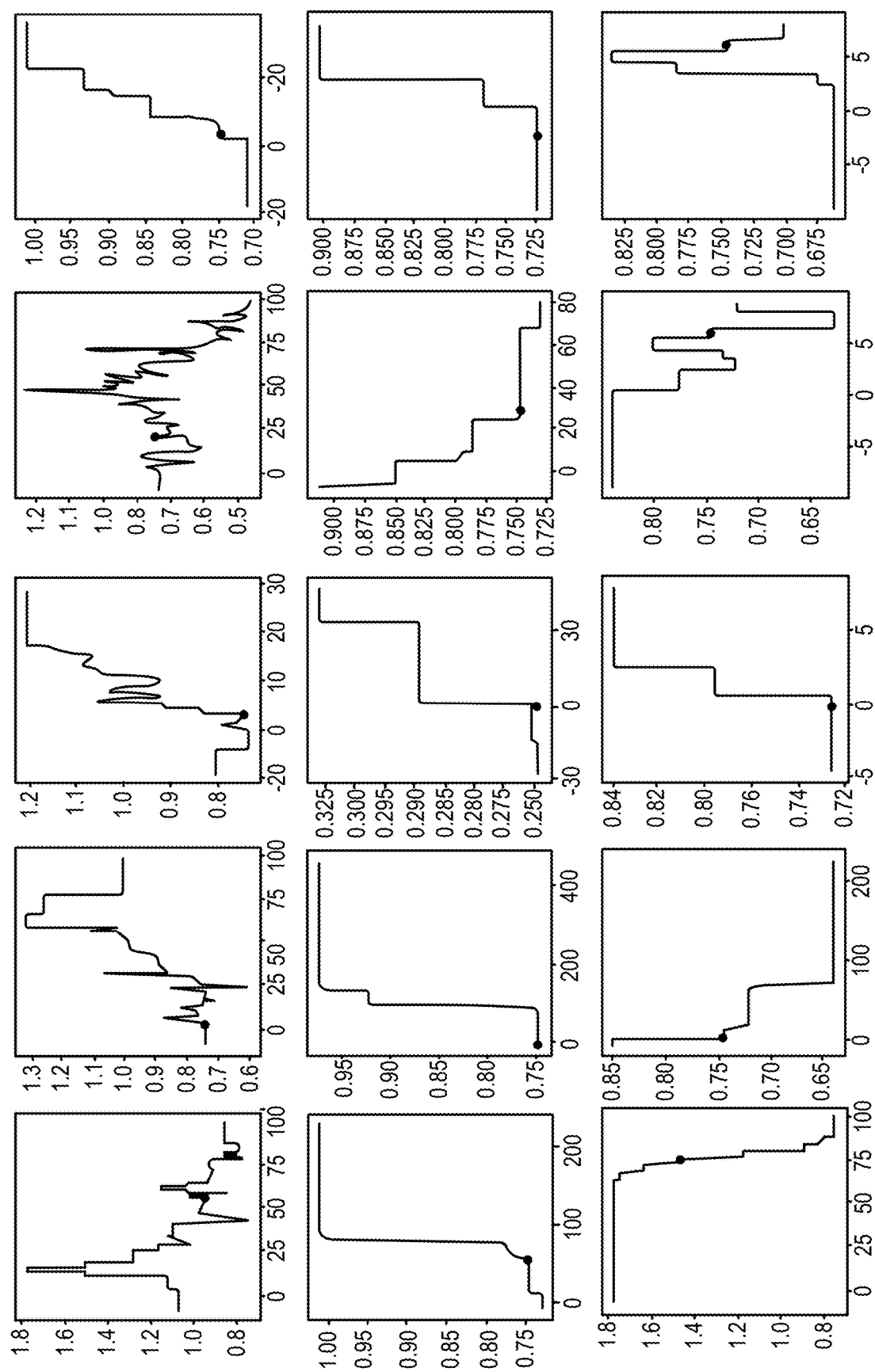
Figure 6:
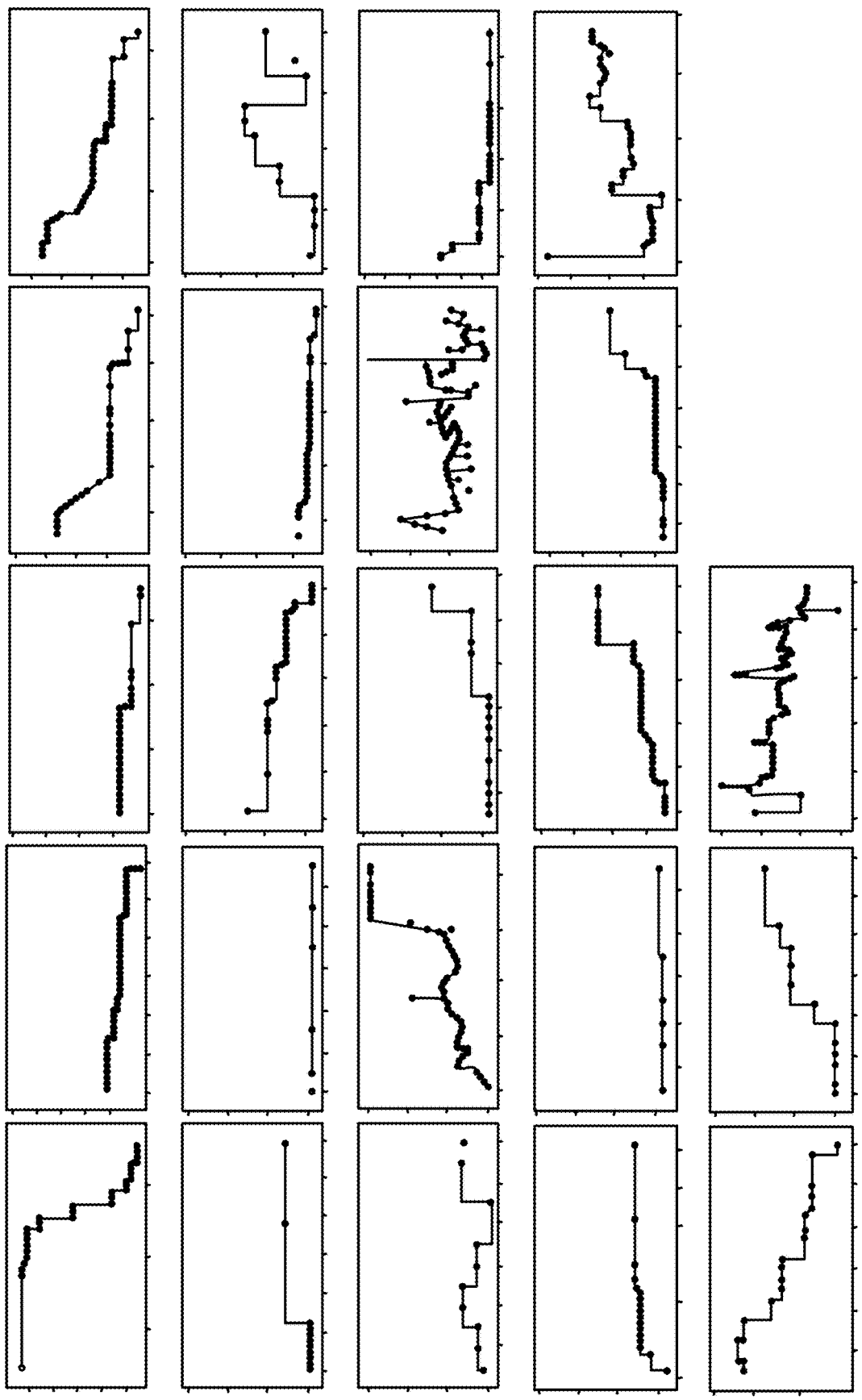

In addition or alternatively, relying on instance explanations, it may be possible to select plausible values which allow for migrating values and constraints that define a model toward results that are statistically supported by historic data, for example. An example visual summary is illustrated in FIG. 5 that shows instances of prediction changes for one or more variables in a model. These changes may also be better understood in terms of the sensitivity of the model to the features. In an example analysis, a feature for a record may be arbitrarily varied across its natural domain. FIG. 6 shows the changes in prediction of such model.

In one or more embodiments, a certificate of explainability may be provided to, for example, certify that the generated results or predictions that are used for explaining the global and local characteristics of the model under test are trustworthy to a certain degree of probability (e.g., distance to target or correcting behavior). The certificate of explainability may include a set of descriptions and interactive visuals that provide information for an instance-level prediction to be trusted. Depending on the intended audience, the certification generated may include information at varying degrees.

Embodiments of the disclosed subject matter may adopt a model dependent or model independent approach depending on implementation, where a plurality of methods may be utilized for explaining a model. One method may include calculating feature importance categorized at a high level as either model-dependent or model-independent. A model-dependent approach may take into account the unique properties of a given machine learning system (e.g., a feature's importance) when explaining the model. In one embodiment, the model-dependent approach may be specific to some techniques. An example technique may be the Gini index for tree-based techniques (e.g., Random Forest), which falls under the category of purity methods. The Gini index may be used to calculate the sum of impurity decrease for each variable over nodes in trees. This approach is simple and has minimal overhead. However, such approach may include biases, preferring categorical variables at many levels, which may mislead the feature importance. Therefore, a model-independent analysis that would obviate such biases may be also implemented.

In accordance with one aspect, model-independent approaches may not be specific for a model or process family and may be used to assess a black-box model (i.e., a model in which the internal functionality or implementations of the model is unknown or obfuscated). For example, permutation importance method may be used to randomly permute a feature to determine how the model performs in the presence of perturbed data. This approach may be implemented based on brute-force, and thereby may involve a substantial level of resources for complex models. However, such approach may perform better than model-dependent counterparts for specific methods, such as Gini index in Random Forest. In such an example, when the data is highly correlated (e.g., when permuting a feature), the feature may be assumed to be independent of other features, as well as the label. In some implementations, to calculate feature importance, conditional permutation importance or other importance indicators such as SHAP values may be used instead to consider the correlations.

In one or more embodiments, one or both model-dependent and model-independent methods may be used to explain various features of a model. Feature relationships offer useful information that provide another window into the functionality of a model, providing a better understanding of the nature of a model, its performance and accuracy, for example. In example embodiments, understanding the relationship between predictors and a conditional average treatment effect (CATE) may be provided by way of a partial dependence plot (PDP). One or more PDP may be utilized to mark the change in the average predicted value, as specified features vary over marginal distributions. In accordance with one variation, PDP may show the average effect of a feature, as a global method for explicability. In other variations, PDPs may be model predictor response relationships under various classification costs, such as asymmetric classification.

Figure 7:
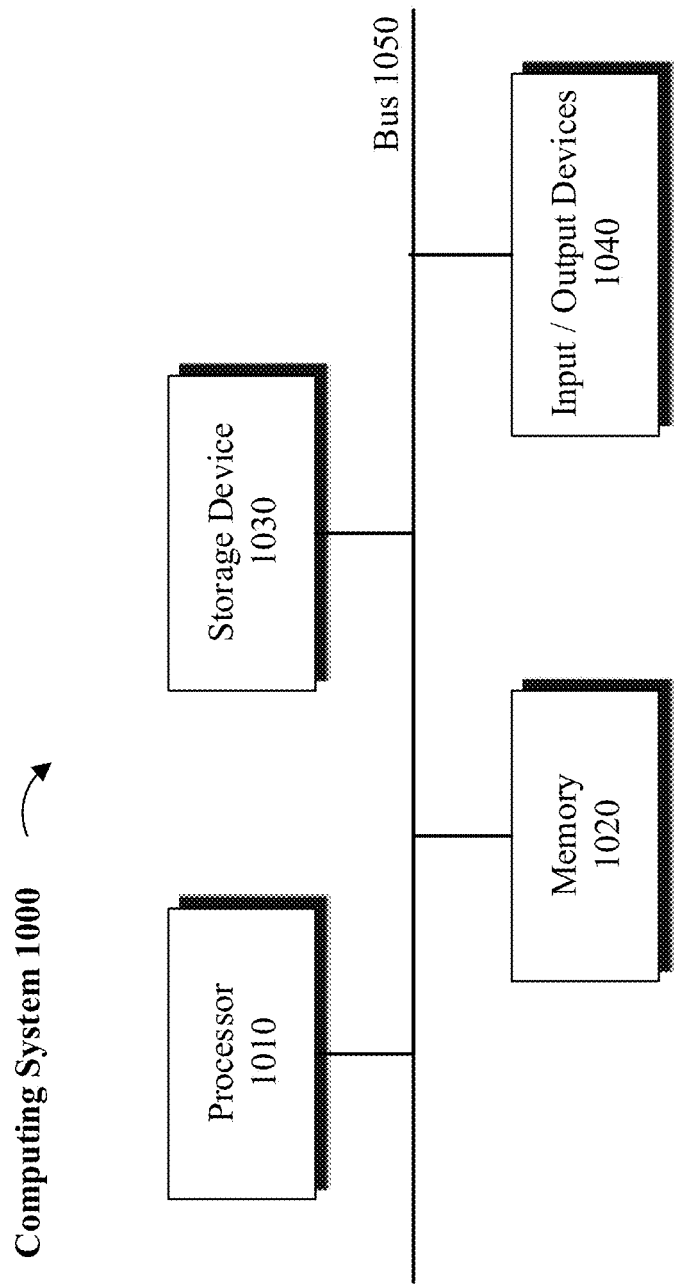
FIG. 7 is a block diagram of a computing system 1000 consistent with one or more embodiments.

Referring to FIG. 7, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 7, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. A computer-implemented method for providing insights about a machine learning model, wherein the machine learning model is trained, during a training phase, to learn patterns to correctly classify input data associated with risk analysis or risk prediction, the method comprising:
    analyzing one or more features of the machine learning model, the one or more features being defined based on one or more constraints associated with one or more values and relationships and whether said one or more values and relationships satisfy at least one of the one or more constraints;

displaying one or more visual indicators based on an analysis of the one or more features and training data used to train the machine learning model, the one or more visual indicators providing a summary of the machine learning model's performance or efficacy;

in response to further analyzing the one or more features and the training data based on at least one of a model-dependent approach or a model-independent approach, providing at least one or more of: a global explanation about the machine learning model or a local explanation about a given prediction instance;

selecting at least one feature and at least another feature in the one or more features and comparing the selected features to determine an influence of each of the selected features on one or more result values generated in response to performing the risk analysis or risk prediction; and configuring at least one of: the selected features, one or more constraints associated with the selected features, and one or more values associated with the selected features;

tuning the machine learning model by adjusting one or more instances of the machine learning model that demand changes to a fewest number of features with a least amount of change to a most important feature of the machine learning model; and generating, based on the configuring, a new risk analysis or risk prediction.

2. The method of claim 1, wherein the global explanation provides general information about one or more functionalities of the machine learning model and at least one of a visualization that summarizes the machine learning model's global behavior with respect to the one or more features, or an identification of a first set of features that are influential in generating one or more identifiable outcomes.

3. The method of claim 1, wherein the model-dependent approach takes into consideration unique properties of the machine learning model, including a feature's importance to the machine learning model's operation to correctly perform a prediction based on the input data.

4. The method of claim 1, wherein the local explanation provides one or more predictions performed by the machine learning model in one or more instances.

5. The method of claim 4, wherein a first instance from the one or more instances comprises one or more execution slices in which at least one or more of the machine learning model's features, constraints, values or variable correlations are identified and tracked for the purpose of understanding how the machine learning model derives a prediction in the first instance.

6. The method of claim 5, wherein the local explanation provides an understanding of how possible changes to an instance's feature values adjust or shift an expected result or projected outcome.

7. The method of claim 5, wherein a first threshold is determined and the local explanation provides an understanding of how possible changes to the instance's feature values adjust or shift an expected result or projected outcome beyond the first threshold.

8. The method of claim 5, wherein in response to understanding how the machine learning model behaves in the first instance, the machine learning model is tuned to select outcomes that best suit an expected result in a first set of instances.

9. The method of claim 5, wherein one or more readable reason codes for one or more sets of features or instances of the machine learning model are generated to explain how the machine learning model derives a prediction in the first instance.

10. A system for providing insights about a machine learning model, wherein the machine learning model is trained, during a training phase, to learn patterns to correctly classify input data associated with risk analysis or risk prediction, the system comprising:

at least one programmable processor; and a non-transitory machine-readable medium storing instructions that, when executed by the at least one programmable processor, cause the at least one programmable processor to perform operations comprising:

analyzing one or more features of a machine learning model, the one or more features being defined based on one or more constraints associated with one or more values and relationships and whether said one or more values and relationships satisfy at least one of the one or more constraints;

displaying one or more visual indicators based on an analysis of the one or more features and training data used to train the machine learning model, the one or more visual indicators providing a summary of the machine learning model's performance or efficacy;

in response to further analyzing the one or more features and the training data based on at least one of a model-dependent approach or a model-independent approach, providing at least one or more of: a global explanation about the machine learning model or a local explanation about the machine learning model;

selecting at least one feature and at least another feature in the one or more features and comparing the selected features to determine an influence of each of the selected features on one or more result values generated in response to performing the risk analysis or risk prediction;

configuring at least one of: the selected features, one or more constraints associated with the selected features, and one or more values associated with the selected features; and tuning the machine learning model by adjusting one or more instances of the machine learning model that demand changes to a fewest number of features with a least amount of change to a most important feature of the machine learning model.

11. The system of claim 10, wherein the global explanation provides general information about one or more functionalities of the machine learning model and at least one of a visualization that summarizes the machine learning model's global behavior with respect to the one or more features, or an identification of a first set of features that are influential in generating one or more identifiable outcomes.

12. The system of claim 10, wherein the model-dependent approach takes into consideration unique properties of the machine learning model, including a feature's importance to the machine learning model's operation for correctly classifying the input data.

13. The system of claim 10, wherein the local explanation provides one or more predictions performed by the machine learning model in one or more instances, wherein the local explanation provides an understanding of how possible changes to a first instance's feature values adjust an expected result or projected outcome, wherein in response to understanding how the machine learning model behaves in the first instance, the machine learning model is tuned to select outcomes that best suit an expected result in a set of instances by minimally changing one or more of the machine learning model's features.

14. The system of claim 13, wherein the first instance comprises one or more execution slices in which at least one or more of the machine learning model's features, constraints, values or variable correlations are identified and tracked for the purpose of understanding how the machine learning model derives a prediction in the first instance.

15. A computer program product for providing insights about a machine learning model, wherein the machine learning model is trained, during a training phase, to learn patterns to correctly classify input data associated with risk analysis or risk prediction, the computer program product comprising a non-transitory machine-readable medium storing instructions that, when executed by at least one programmable processor, cause the at least one programmable processor to perform operations comprising:
- analyzing one or more features of a machine learning model, the one or more features being defined based on one or more constraints associated with one or more values and relationships and whether said one or more values and relationships satisfy at least one of the one or more constraints;
- displaying one or more visual indicators based on an analysis of the one or more features and training data used to train the machine learning model, the one or more visual indicators providing a summary of the machine learning model's performance or efficacy;
- in response to further analyzing the one or more features and the training data based on at least one of a model-dependent approach or a model-independent approach, providing at least one or more of: a global explanation about the machine learning model or a local explanation about the machine learning model;
- selecting at least one feature and at least another feature in the one or more features and comparing the selected features to determine an influence of each of the selected features on one or more result values generated in response to performing the risk analysis or risk prediction;
- configuring at least one of: the selected features, one or more constraints associated with the selected features, and one or more values associated with the selected features; and
- tuning the machine learning model by adjusting one or more instances of the machine learning model that demand changes to a fewest number of features with a least amount of change to a most important feature of the machine learning model.

16. The computer program product of claim 15, wherein the global explanation provides general information about one or more functionalities of the machine learning model and at least one of a visualization that summarizes the machine learning model's global behavior with respect to the one or more features, or an identification of a first set of features that are influential in generating one or more identifiable outcomes.

17. The computer program product of claim 15, wherein the model-dependent approach takes into consideration unique properties of the machine learning model, including a feature's importance to the machine learning model's operation for correctly classifying the input data.

18. The computer program product of claim 15, wherein the local explanation provides one or more predictions performed by the machine learning model in one or more instances.

19. The computer program product of claim 18, wherein a first instance from the one or more instances comprises one or more execution slices in which at least one or more of the machine learning model's features, constraints, values or variable correlations are identified and tracked for the purpose of understanding how the machine learning model derives a prediction in the first instance.

* * * * *